US008892628B2

(12) United States Patent
Nicholson et al.

(10) Patent No.: US 8,892,628 B2
(45) Date of Patent: Nov. 18, 2014

(54) ADMINISTRATIVE INTERFACE FOR MANAGING SHARED RESOURCES

(75) Inventors: Clark David Nicholson, Seattle, WA (US); Robert Wilhelm Schmieder, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 391 days.

(21) Appl. No.: 12/752,840

(22) Filed: Apr. 1, 2010

(65) Prior Publication Data
US 2011/0246552 A1 Oct. 6, 2011

(51) Int. Cl.
G06F 15/16 (2006.01)
G06F 15/173 (2006.01)
G06F 3/00 (2006.01)
G06F 3/048 (2013.01)
H04L 29/08 (2006.01)

(52) U.S. Cl.
CPC ...................................... H04L 67/14 (2013.01)
USPC ........... 709/202; 709/223; 709/227; 709/228; 715/751; 715/753; 715/759; 715/779; 715/792

(58) Field of Classification Search
CPC ............ H04L 12/2869; H04L 12/5692; H04L 12/5695; H04L 67/1097; H04L 67/24; H04L 67/2842; H04L 65/1066; H04L 65/1069; H04L 65/1083; H04L 629/12339; H04L 629/08396; H04L 629/0845; H04L 629/08468
USPC .......... 709/202, 223, 227, 228; 715/751–753, 715/759, 778–779, 792
See application file for complete search history.

(56) References Cited

U.S. PATENT DOCUMENTS

| 6,138,120 | A | 10/2000 | Gongwer et al. |
| 6,191,807 | B1 | 2/2001 | Hamada et al. |
| 6,584,493 | B1 | 6/2003 | Butler |
| 6,601,087 | B1 | 7/2003 | Zhu et al. |
| 6,633,906 | B1 | 10/2003 | Callaway et al. |
| 6,859,928 | B2 | 2/2005 | Wright |
| 7,184,531 | B2 | 2/2007 | Crouch |
| 7,305,562 | B1 | 12/2007 | Bianco et al. |
| 7,314,412 | B2 * | 1/2008 | Hedin et al. ..................... 463/29 |
| 7,424,543 | B2 * | 9/2008 | Rice, III ........................ 709/229 |

(Continued)

FOREIGN PATENT DOCUMENTS

WO WO 2007078781 A2 * 7/2007

OTHER PUBLICATIONS

McCune et al., "Seeing-Is-Believing: Using Camera Phones for Human-Verifiable Authentication", IEEE Stymposium on Security and Privacy, May 2005, 15 pages.

(Continued)

Primary Examiner — David Lazaro
Assistant Examiner — Farzana Huq
(74) Attorney, Agent, or Firm — Dan Choi; Judy Yee; Micky Minhas (57) ABSTRACT

A shared resource computing (SRC) system that provides a mechanism for creating a shared session among individual sessions is described. In an ad hoc peer model, a session is created by individual users. One individual session assumes an administrative session role and invites other user sessions to join the shared session. Local environments from the individual sessions are published and the resources of the individual sessions form linked device groups that allow the resources to be aggregated for the shared session.

20 Claims, 7 Drawing Sheets

(56) References Cited

U.S. PATENT DOCUMENTS

| | | | |
|---|---|---|---|
| 7,451,181 B2 | 11/2008 | Sasaki et al. | |
| 7,526,541 B2 | 4/2009 | Roese et al. | |
| 7,530,022 B2 | 5/2009 | Ben-Shachar et al. | |
| 7,552,391 B2 | 6/2009 | Evans et al. | |
| 7,584,239 B1* | 9/2009 | Yan et al. | 709/201 |
| 7,595,798 B2 | 9/2009 | Ben-Shachar et al. | |
| 7,606,909 B1 | 10/2009 | Ely et al. | |
| 7,664,750 B2* | 2/2010 | Frees et al. | 707/608 |
| 7,676,582 B2* | 3/2010 | Schmieder | 709/227 |
| 7,849,420 B1 | 12/2010 | Amidon et al. | |
| 8,352,938 B2* | 1/2013 | Hunt et al. | 718/1 |
| 2003/0197729 A1* | 10/2003 | Denoue et al. | 345/751 |
| 2004/0189701 A1 | 9/2004 | Badt, Jr. | |
| 2004/0193678 A1 | 9/2004 | Trufinescu et al. | |
| 2005/0059492 A1* | 3/2005 | Hedin et al. | 463/42 |
| 2005/0091609 A1 | 4/2005 | Matthews et al. | |
| 2005/0132299 A1* | 6/2005 | Jones et al. | 715/759 |
| 2005/0138566 A1 | 6/2005 | Muller et al. | |
| 2005/0235139 A1 | 10/2005 | Hoghaug et al. | |
| 2006/0010125 A1 | 1/2006 | Beartusk et al. | |
| 2006/0080432 A1 | 4/2006 | Spataro et al. | |
| 2006/0083244 A1 | 4/2006 | Jagadesan et al. | |
| 2006/0123351 A1 | 6/2006 | Littlefield | |
| 2006/0268007 A1 | 11/2006 | Gopalakrishnan | |
| 2006/0294465 A1 | 12/2006 | Ronen et al. | |
| 2007/0136419 A1 | 6/2007 | Taylor et al. | |
| 2007/0198744 A1 | 8/2007 | Wensley et al. | |
| 2007/0226225 A1 | 9/2007 | Yiu et al. | |
| 2007/0276910 A1 | 11/2007 | Deboy et al. | |
| 2008/0059539 A1 | 3/2008 | Chin et al. | |
| 2008/0091692 A1 | 4/2008 | Keith et al. | |
| 2008/0215995 A1 | 9/2008 | Wolf | |
| 2009/0006948 A1 | 1/2009 | Parker et al. | |
| 2009/0049392 A1 | 2/2009 | Karttunen et al. | |
| 2009/0144639 A1 | 6/2009 | Nims et al. | |
| 2009/0157628 A1 | 6/2009 | Arthursson et al. | |
| 2009/0222742 A1* | 9/2009 | Pelton et al. | 715/753 |
| 2009/0228808 A1 | 9/2009 | MacDonald et al. | |
| 2009/0235331 A1 | 9/2009 | Dawson et al. | |
| 2009/0254843 A1 | 10/2009 | Van Wie et al. | |
| 2009/0259588 A1 | 10/2009 | Lindsay | |
| 2009/0282346 A1* | 11/2009 | Bechtel et al. | 715/751 |
| 2009/0300510 A1* | 12/2009 | Gantman et al. | 715/740 |
| 2010/0080361 A1* | 4/2010 | Houghton | 379/87 |
| 2010/0131868 A1* | 5/2010 | Chawla et al. | 715/759 |
| 2010/0185954 A1* | 7/2010 | Simernitski et al. | 715/751 |
| 2011/0239117 A1 | 9/2011 | Sutton et al. | |
| 2011/0239133 A1 | 9/2011 | Duffus et al. | |
| 2011/0296043 A1 | 12/2011 | Sutton et al. | |
| 2012/0047002 A1 | 2/2012 | Patel | |
| 2012/0115603 A1 | 5/2012 | Shuster | |
| 2012/0167235 A1 | 6/2012 | Donfried | |

OTHER PUBLICATIONS

Office action for U.S. Appl. No. 12/732,018, mailed on Jun. 12, 2012, Sutton et al., "Natural User Interaction in Shared Resource Computing Environment", 24 pages.

Office action for U.S. Appl. No. 12/732,018, mailed on Sep. 11, 2013, Sutton, et al., "Natural User Interaction in Shared Resource Computing Environment", 21 pages.

Office action for U.S. Appl. No. 12/749,037, mailed on Jul. 30, 2013, Duffus et al., "Shared Resource Computing Collaboration Sessions Management", 13 pages.

Office action for U.S. Appl. No. 12/791,731, mailed on Aug. 30, 2012, Sutton et al., "Managing Shared Sessions in a Shared Resource Computing Environment", 23 pages.

Office action for U.S. Appl. No. 12/791,731, mailed on Jan. 2, 2013, Sutton et al., "Managing Shared Sessions in a Shared Resource Computing Environment", 22 pages.

Office action for U.S. Appl. No. 12/732,018, mailed on Dec. 13, 2012, Sutton et al, "Natural User Interaction in Shared Resource Computing Environment", 27 pages.

ATEN, CS231 "Computer Sharing Device" Data Sheet, Dec. 2006, Version 1.0, 1 page.

Office action for U.S. Appl. No. 12/749,037, mailed on Feb. 27, 2013, Duffus, "Shared Resource Computing Collaboration Sessions Management", 13 pages.

Office action for U.S. Appl. No. 12/791,731, mailed on Apr. 5, 2013, Sutton et al., "Managing Shared Sessions in a Shared Resource Computing Environment", 21 pages.

Benford, Bowers, Fahlen, Greenhalgh, Snowdon, "Embodiments, avatars, clones and agents for multi-user, multi-sensory virtual worlds", retrieved on Dec. 1, 2009 at <<http://www.springerlink.com/content/lpyj86157yt62jkc/fulltext.pdf>>, Springer-Verlag, Multimedia Systems, vol. 5, Mar. 1, 1997, pp. 93-104.

"Collaborative Virtual Workspace Overview", retrieved on Dec. 14, 2009 at <<http://cvw.sourceforge.net/cvw/info/CVWOverview.php3>>, Oct. 13, 2000, pp. 1-4.

Global Crossing, retrieved on Jun. 15, 2010 at <<http://www.globalcrossing.com/>> 1 page.

Humphrey, "NetMeeting 3.01 Remote Desktop Sharing: Security Concerns", retrieved on Dec. 11, 2009 at <<http://www.sans.org/reading_room/whitepapers/windows/netmeeting_3_01_remote_desktop_sharing_security_concerns_1119>>, SANS Institute, SANS GIAC Practical Paper, Assignment Version 1.4b, Option 1, May 20, 2003, pp. 1-17.

"MultiPoint for Education", Microsoft Research, retrieved Feb. 1, 2010 at http://research.microsoft.com/en-us/um/india/projects/multipoint, 2007, 3 pgs.

NetSupport School, http://www.netsupportschool.com, 8 pages.

Netsupport School: The Classroom Management Software, retrieved on Jun. 15, 2010 at <<http://www.netsupportschool.com/>> 1 page.

Ohmori et al, "Distributed Cooperative Control for Sharing Applications Based on Multiparty and Multimedia Desktop Conferencing System: MERMAID", received on Dec. 11, 2009 at <<http://ieeexplore.ieee.org/stamp/stamp.jsp?tp=&arnumber=234999&isnumber=6052>>, IEEE, Proceedings of the 12th International Conference on Distributed Computing Systems, Jun. 9, 1992, pp. 538-546.

Piszcz et al, "Realizing a Desktop Collaborative Workspace", received on Dec. 11, 2009 at <<http://citeseerx.ist.psu.edu/viewdoc/download?doi=10.1.1.126.9607&rep=rep1&type=pdf>>, The MITRE Corporation, MP 98W0000215, Nov. 1998, pp. 1-11.

Rekimoto, "A Multiple Device Approach for Supporting Whiteboard-based Interactions", retrieved on Dec. 14, 2009 at <<http://www.csm.uwe.ac.uk/~fjmaddix/Web2002/UQI120S2/Futures/chi98.pdf>>, 1998, pp. 1-8.

Saddik, Rahman, Abdala, Solomon, "PECOLE: P2P multimedia collaborative environment", retrieved on Dec. 14, 2009 at <<http://www.mcrlab.uottawa.ca/index.php?option=com_docman&task=doc_download&gid=6&Itemid=36>>, Springer Netherlands, Multimedia Tools and Applications Journal, vol. 39, No. 3, Aug. 8, 2007, pp. 353-377.

Tee, "Shared Screens and Windows", retrieved on Dec. 14, 2009 at <<http://pages.cpsc.ucalgary.ca/~tee/uploads/Main/781chapter.pdf>>, University of Calgary, Oct. 10, 2007, pp. 1-10.

Toorop, Leenaars, "Desktop sharing with the Session Initiation Protocol", retrieved on Dec. 1, 2009 at <<http://www.delaat.net/~cees/sne-2008-2009/p29/report.pdf>>, University of Amsterdam, System & Network Engineering Research Project 1, Feb. 25, 2009, pp. 1-45.

Virtual Worlds, Avatars, Second Life Official Site, retrieved on Jun. 15, 2010 at <<http://secondlife.com/>> 6 pages.

Wikipedia, "Computer Supported Cooperative Work", retrieved on Feb 1, 2010 at http://en.wikipedia.org/wiki/computer_supported_coopeative_work, Jan. 2010, 8 pgs.

Wikipedia, "Desktop Virtualization", retrieved on Feb. 1, 2010 at http://en.wikipedia.org/wiki/desktop_virtualization, Jan. 2010, 4 pgs.

Wikipedia, "Time Sharing", retrieved on Feb. 1, 2010 at http://en.wikipedia.org/wiki/timesharing, Jan. 2010, 6 pgs.

Office action for U.S. Appl. No. 12/732,018, mailed on Feb. 14, 2014, Sutton, et al., "Natural User Interaction in Shared Resource Computing Environment", 23 pages.

(56) References Cited

OTHER PUBLICATIONS

Office action for U.S. Appl. No. 12/791,731, mailed on Feb. 14, 2014, Sutton, et al., "Managing Shared Sessions in a Shared Resource Computing Environment", 21 pages.

Office action for U.S. Appl. No. 12/749,037, mailed on Feb. 25, 2014, Duffus, et al., "Shared Resource Computing Collaboration Sessions Management", 14 pages.

\* cited by examiner

ADMINISTRATIVE INTERFACE FOR MANAGING SHARED RESOURCES

BACKGROUND

The majority of small computer networks exist in environments with minimal Information Technology (IT) expertise and no centralized management infrastructure. Consequently, many workers are relegated to working in isolation and are unable to realize the full potential of a networked computing environment achieved through sharing of computing resources.

Several problems may occur in such an environment that inhibit the easy sharing of computing resources. Generally, the problems can be assigned to four different categories. The first category is exposing the resources that are available for sharing within the network so that users can decide how to organize into sharing groups and which resources to share within each group. Monitoring is the other category. Administrative users, such as a teacher, small business owner, parent, or administrative user on a particular system are unable to track what other users are doing and how equipment is behaving without physically walking around to each individual user's computing station. Consequently, efficiency and resource management are difficult to monitor and hence, making strategic decisions is difficult.

Another area that may create issues is control. Administrative users cannot easily control what users are doing with the computing equipment and therefore how resources should be shared amongst users. Again, this makes it difficult to manage the resources and make the most effective use of the resources.

Finally, maintenance is a concern. Users cannot easily keep the equipment running properly and protect data from failures. This is also closely tied to monitoring and control. When the administrator is uncertain how the equipment is being used and whether it is running properly, it is difficult to provide proper maintenance to the equipment.

Existing Shared Resource Computing (SRC) systems allow users, to some extent, to address and solve these issues and concerns for a small subset of the potentially sharable computing resources. However, a general solution that allows the full breadth of computing resources to be shared does not exist.

SUMMARY

This document describes an administrative interface for managing SRC resources. In one embodiment, the SRC system described begins with a number of individual or user sessions. One of the user sessions publishes itself as a shared session. The shared session publishes both the available resources in the shared session as well as the recommended and/or required resources for participation in the shared session by other user sessions. These other user sessions may identify and view the published available resources and the required and/or recommended resources and make a determination whether or not they wish to participate in the shared session. A particular user session may then request and/or accept participation in the shared session and the peripheral devices from the participating user sessions are mapped into the shared session.

In another embodiment, an administrative session may be created on a host computer accessible by an administrator terminal. A request to create a shared session accessible by multiple terminals or individual or user sessions may be received from the administrator terminal. A shared session may be created in response to the request for a shared session and permissions may be defined in the request for access to the shared session. Input may be received at the host computer from the participating terminals or user sessions. The aggregated or mapped input may then be displayed or outputted to the multiple terminals. This process may be repeated to change administrative control to another group.

Another embodiment may link two or more different peripheral display devices into a single display device in the shared session to provide a more usable display in certain instances.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Overview

In an SRC system, computers and sessions on the local network may be automatically discovered and groups may be formed. Groups may be relatively permanent or temporary. Groups may also be planned by a central authority or formed in an ad hoc peer arrangement. Groups may also span physical and logical resources, such as files, or may be formed around work spaces, such as application windows or desktop sessions.

In one embodiment of the SRC system, a program, called an agent, runs in the background on each terminal and/or within each user session. Terminals or stations may be any type of peripheral device, such as a dumb terminal, a personal computer, any number of USB devices (such as storage devices and various input/output devices) or any other type of terminal which provides an ability for the user to interface with the SRC system. The agent communicates on behalf of the terminal or the user session to contact other agents to publish its local environment and discover an environment around it. The agent monitors, reports and enforces the operation of the shared session. A local environment may be published and includes information related to hardware resources, software resources and data resources accessible to the respective terminal or session. Hardware resources, software resources and data resources may include, but not be limited to, applications, operating system settings and drivers. In addition to the resources accessible for shared among the sessions, recommended and/or required resources for participation in the shared session are also published and are a part of the local environment. Each agent has a local user interface that identifies the discovered local environment and allows the user to control what, if any, of the local discovered environment is published. In the case of terminals with no processing power or memory, the agent and the published environment may reside on a host computer. Even in the case of a personal computer that is used as a terminal, the user may choose not to publish the storage or memory capabilities as a part of the local environment and therefore, have the agent and the local environment reside on the host computer. Alternatively, the user may choose to have the agent and local environment reside on the personal computer in this case, even though it would allow others in the SRC environment at least limited access to the personal computer. Through the interface, an administrative user may establish a group or shared session through these agents and enforce rights and permissions of other users. In the alternative, an ad hoc peer group may be formed by a user of any terminal of the SRC environment by publishing a name for a group and asking others to join.

The foregoing explanation provides a brief overview of the SRC system, however, a more detailed description follows.

Illustrative Architecture

Figure 1:
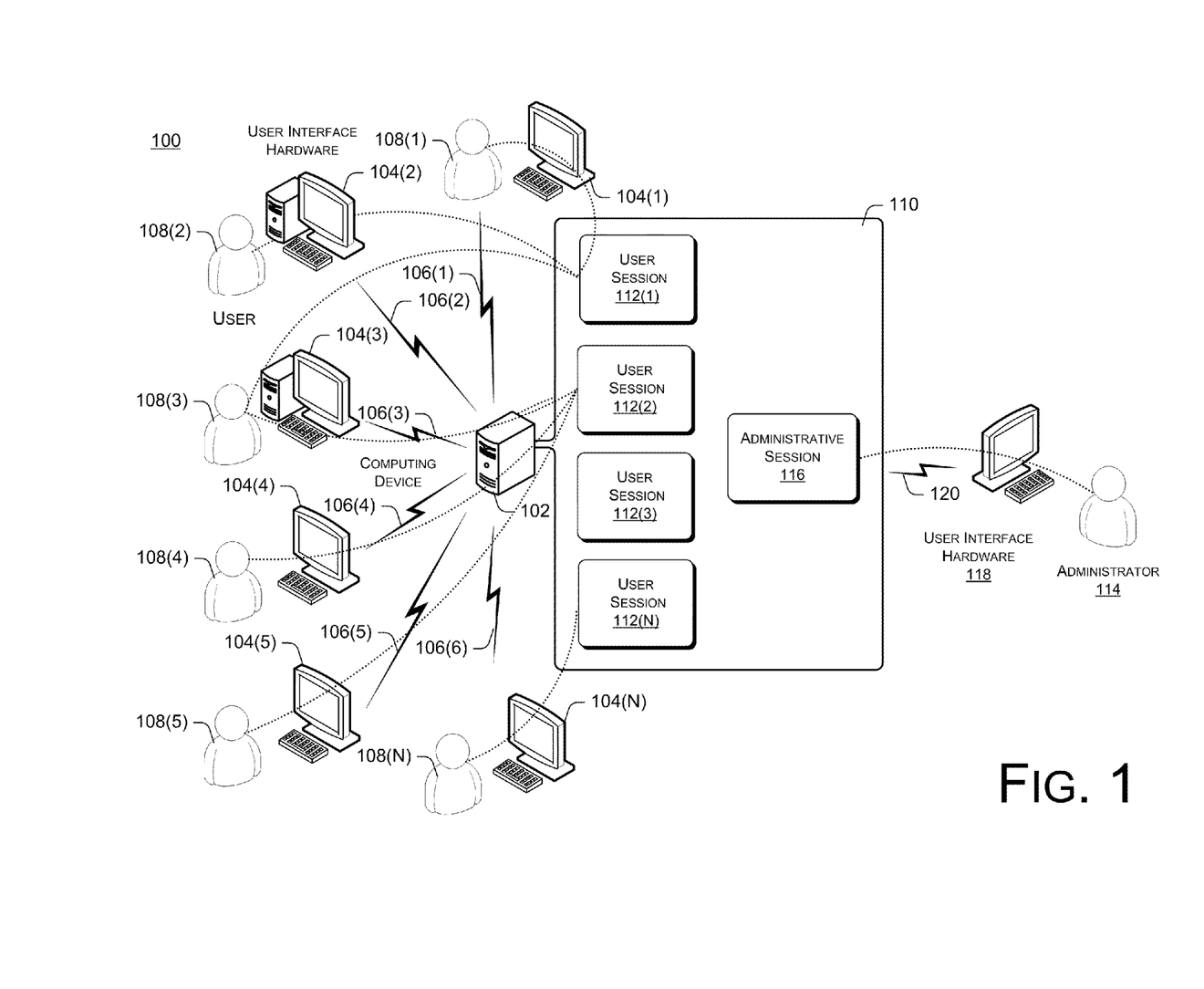
FIG. 1 is a block diagram that illustrates an example shared resource computing architecture that enables the administration of multiple computer users that are sharing multiple user sessions on a single computing device.

FIG. 1 illustrates an example shared resource computing architecture 100 that enables the administration of multiple computer users that are sharing multiple desktop sessions on a single computing device.

The computing device 102 may be capable of simultaneously receiving a plurality of user inputs from multiple user interfaces, as well as providing processed data to the users via the multiple user interfaces. In various embodiments, the computing device 102 may be a desktop computer, a laptop computer, a multimedia computer, a server, a mobile phone or the like. The multiple user interfaces may include user interface hardware 104(1)-104(N), where the actual number of user interface hardware 104(1)-104(N) may vary. The multiple user interfaces may be connected to the computing device 102 via corresponding I/O connections 106(1)-106(N). Moreover, the user interface hardware 104(1)-104(N) may enable corresponding users 108(1)-108(N) to interact with the computing device 102.

In various embodiments, the user interface hardware 104(1)-104(N) may include one or more "peripheral" interfaces and/or one or more "thin-client" interfaces and/or one or more personal computers. In fact, the makeup of the user interface hardware 104 may be in virtually any configuration that allows interaction in the shared session. It may be as simple as a monitor and a keyboard, i.e., the basic requirement is simply a display device and an input device. In the embodiment shown in FIG. 1, the "peripheral" interface of user interface hardware 104(1) may include a display device (e.g., a monitor) that presents data to the corresponding computer user 106(1), as well as one or more input devices (e.g., a keyboard and/or mouse) that transfers input from the computer user 106(1) to the computing device 102. However, in other embodiments, the data input devices of the user interface hardware 104(1) may include, but are not limited to, combinations of one or more of keypads, mouse devices, touch screens, microphones, cameras, speech recognition packages, and any other suitable devices or other electronic/software.

The user interface hardware 104(1), 104(4), 104(5) and 104(N) may be connected to the computing device 102 via an input/output (I/O) connection 106. The I/O connection 106(1) may be any wired, wireless or network connection, such as a universal serial bus (USB) connection, a DisplayPort connection, IEEE 1394 connections, 802.11 and/or the like. The user interface hardware 104(1), 104(4), 104(5) and 104(N) may be a direct connection to the computing device 102 since the user interface hardware 104(1), 104(4), 104(5) and 104(N) in this particular example does not include computing capability.

The user interface hardware 104(2) and 104(3) may be a "thin-client" computing device, such as a computing device that is running a limited operating system. The "thin-client" computing device may include a display component (e.g., LCD monitor) and a user input component (e.g., keyboard, mouse, and/or other components as describe above). A thin-client is only one way of combining some peripheral devices together and connecting them in a network. The user interface hardware 104(2) and 104(3) may also include a computing device such that the shared session may run on the user interface hardware 104(2) and 104(3) instead of computing device 102. The example shown in FIG. 1 is a simplified example. The shared session may be spread across multiple computers or on a single computer as shown in FIG. 1. Consequently, many other methods of connection and hardware configurations may be contemplated. As stated earlier, a display device and a keyboard may be sufficient. The display component and the user input component of the "thin-client" computing may be connected to a basic processor and memory architecture that is capable of receiving, processing, storing, transmitting, and displaying data. The basic processor and memory architecture of the "thin-client" may be connected to the computing device 102 via input/output (I/O) connection 106(2). The I/O connection 106(2) may be any wired, wireless or networked serial or parallel data transfer connection, a universal serial bus (USB) connection, a DisplayPort connection, IEEE 1394 connections, and/or the like.

Thus, "direct I/O connection," as used herein, refers to a connection between two devices that is implemented without the use of network components, such as network interface cards, hubs, routers, servers, bridges, switches, and other components commonly associated with communications over the Internet, as well as without reliance on software applications and protocols that are typically used for communication over the Internet. A thin-client may be connected either through a direct I/O connection or a networked connection. This may be one convenient way to aggregate devices into a station to get connected to a session in computing device 102. In the embodiment shown in FIG. 1, the user interface hardware 104(4)-104(N) are also "peripheral" interfaces or devices, while 104(3) is also a "thin-client" interface. The word "terminal" will be used throughout this document to refer to peripheral interfaces or device, thin-client interfaces or any other type of station or peripheral device. However, it will be appreciated that the various computing devices described herein may nevertheless have software and/or hardware that provide networking capabilities.

In various embodiments, the computing device 102 may provide a shared resource computing environment 110. The users 108(1)-108(N) may access one or more user sessions, such as the user sessions 112(1)-112(N). Each of the user sessions 112(1)-112(n) may be a workspace where a single computer user may engage in a computing task, or a plurality of computer users may collaborate on the same computing task or share in a common computing experience. User sessions include individual sessions, shared sessions and administrative sessions and will be discussed in more detail below.

For example, as shown in FIG. 1, the user session 112(1) may be running a multi-user word processing application that enables computer users (e.g., computer users 108(1), 108(2), and 108(3)), to concurrently edit a document. As used herein, "concurrently" may refer to the simultaneous or the sequential input of data to produce a result. The user session 112(2) may be running a math application that enables a second plurality of computer users (e.g., computer users 108(3)-108(5)), to share the task of solving a math puzzle 112(2). Further, the computer user 108(N) may be working independently on a multimedia presentation in the user session 112(N), while the user session 112(3) may be inactive. Computer user 108(3) is participating in two user sessions 112(1) and 112(2). Computer users may be a part of one, none or more than one user session 112 depending on the administrative settings for a particular shared session.

The user sessions of the shared resource computing environment 110, such as the user sessions 112(1)-112(N), may be administered by an administrator 114 using an administrative session 116. The administrator 114 may interact with the administrative session 116 using a user interface hardware or terminal 118 that is connected to the computing device via a direct I/O connection or networked connection or wireless connection 120. While the terminal 118 is illustrated in the embodiment shown in FIG. 1 as a "peripheral" interface, the terminal 118 may also be a "thin-client" interface in other embodiments. FIG. 1 demonstrates only one simplified example of the various configurations and connections for the SRC process. Moreover, the administrative session 116 may enable the administrator 114 to perform a variety of tasks related to computer user and user session management and control. Such tasks may include, but are not limited to, selecting and placing computer users into user sessions, moving computer users to different user sessions, removing users from user sessions, and/or recording and playing user interaction with the user sessions. Additionally, as further described below, the administrative session 116 may further allow the administrator 114 to create new user sessions, terminate user sessions, save user sessions, suspend user sessions and/or resume user sessions. In some embodiments, the administrator 114 may be one of the computer users of the user sessions 112(1)-112(n), such as computer user 106(1).

Figure 2:
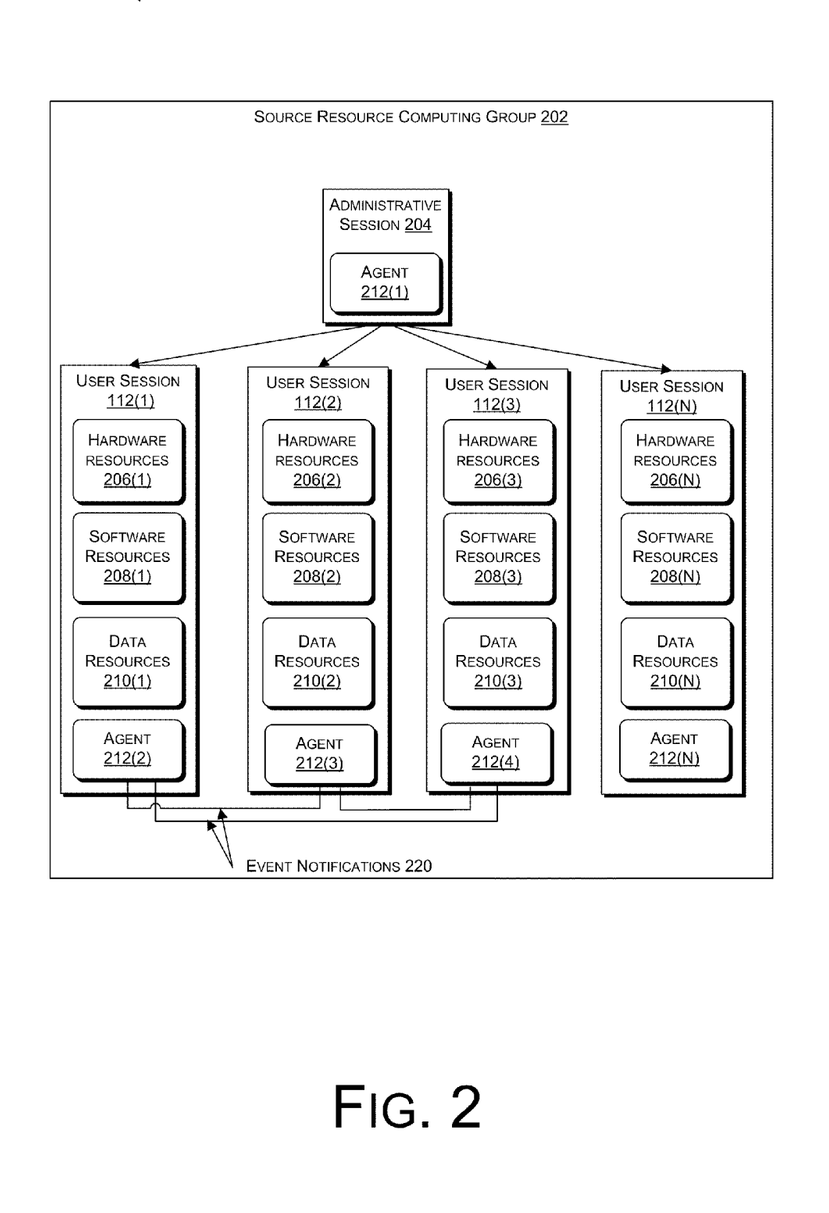
FIG. 2 is a block diagram that illustrates selected example components for the performance and administration of shared resource computing.

FIG. 2 is a block diagram that illustrates selected components for the performance and administration of SRC system 200. An SRC group 202 is formed. An administrative session 204 may be created in a number of ways. For instance, an administrative session 204 may be designated ahead of time, participants in the SRC group may designate an administrator from among the group or one of the user sessions may enter a login and password to become the administrator. A user of terminal 118 may automatically establish an administrative session. Several user sessions 112(1) . . . 112(N) exist in the SRC group 202. Again, user sessions may include individual sessions, shared sessions and administrative sessions. Individual sessions are sessions either residing on a host computer or on an individual user terminal and accessible by a single user/terminal. Shared sessions indicate a session accessible by multiple users/terminals. An administrative session may be one of the individual sessions designated as the administrator for a shared session or it may be one of the individual sessions that has login and password information to login as the administrator. The administrator controls the administrative session and thus maintains control over the shared session. Each of the individual sessions includes one or more hardware resources 206(1) . . . 206(N), one or more software resources 208(1) . . . 208(N), one or more data resources 210(1) . . . 210(N) and one or more agents 212(1) . . . 212(N).

A shared session is managed by the administrative session 204. Any of the user sessions 112 may be a shared session, depending on how the SRC group is structured.

Figure 3:
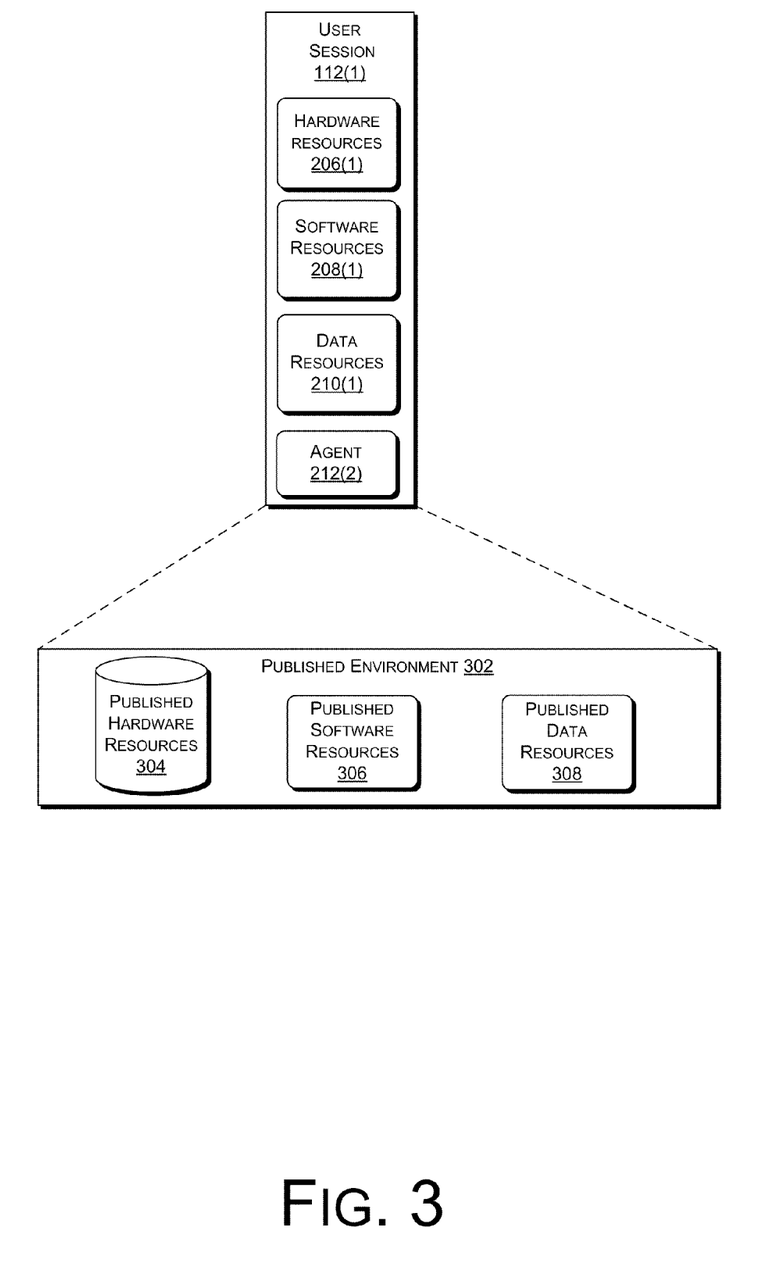
FIG. 3 is a block diagram that illustrates an example of a published environment for an individual session.

The administrator is able to use available published resources, described further in FIG. 3, to manage and control the shared session among the participants in the SRC group 202. The agent 212 in the administrative session allows the administrator to monitor, report and enforce the parameters of the SRC group 202. Prior to establishing a shared session, the agents 212 are communicating (for example, through a publish/subscribe communication paradigm) to publish available resources in each session and, if necessary, required resources to participate in a sharable session. Once a shared session is established, event notifications 220 may be transmitted among the agents 212. Event notifications 220 are passed between agents 212 to alert the various user sessions 112 of different events or activities that are available within the SRC group 202. For example, an alert to an upcoming presentation may be presented as an event notification, changes in time and program may be presented or any other type of event notification that affects the shared session.

Each of the user sessions 112 may be connected to a terminal as shown in FIG. 1.

Referring now to FIG. 3, a block diagram that illustrates an example of a published environment for a user session 112(1) is shown. User session 112(1) is used as an example from FIG. 2. Any of the user sessions 112 or any combination of the user sessions 112 may publish an environment 302. The published environment 302 simply makes available certain resources that may be shared as part of the shared session. A particular user session 112 may decide which resources to make available. For instance, a user session 112 may choose to make some of its resources available or none of its resources available or a portion of its resources available. In some cases, the administrator may have control over what resources are to be made available to other user sessions 112. The published environment 302 may also includes resources of the user session that are recommended and/or required for participation by that user session in the shared session. These minimum recommended and/or required resources may for example, state that a monitor, keyboard, mouse are required and a digitizer is recommended, but not required. These resources are not resources to be shared but rather are used by the individual session who is participating in the shared session. The resources for both types of published environment may include published hardware resources 304, published software resources 306 and published data resources 308, which may include, for example memory, drives, cameras, operating system settings, software applications and drivers. Any or all of these resources from each of the user sessions may be used to implement the SRC group shared session. When establishing a shared session, the administrator may select from among the published resources to define the resources available to the shared session.

The published environment 302 may also be used to allow the other user sessions the ability to determine whether or not to join a shared session. In some cases, the administrator has control and may add or remove user sessions to/from a shared session. However, in many cases, user sessions 112 may decide whether or not to join an SRC group, especially in the ad hoc peer model. In this scenario, the user sessions 112 may view the published environment 302 of other individual sessions 112 and determine whether their own resources are compatible with the published environment 302. If the resources are compatible and the shared session is of interest to the user of the session 112, the user session may send a message from its agent to the administrative session agent that it would like to join the session. A user session 112 may initiate these communications within the agent via a user interface and various input devices, such as a mouse, keyboard, pen tablet, etc.

Referring now to FIGS. 2 and 3 together, in one embodiment using an ad hoc peer model, one of the individual sessions 112 is identified as an administrative session 204 by accessing an administrative account using a password and username or some other logon mechanism. It is also possible that an administrative session 204 may be designated in advance or be selected by the participants in an SRC group 202. Once a user/terminal is identified as an administrative session 204, the administrative session 204 has the ability to manage and control a shared session. The administrative session 204 may include a discovery protocol (not shown) that discovers devices and/or user sessions that further allow for the management and control of the shared session. The management and control may include, for instance, an ability to invite new participants, an ability to determine what applications are available, an ability to force participants from a session, etc. When a user is invited to join a shared session, the user may consent to join the shared session or decline to join the shared session. Once a session is identified as an administrative session, the administrative session may have control and management ability to control anything from shutting down shared hardware resources, software resources and data resources to rebooting these shared resources. The privileges and permissions may be set up such that some users can make modifications while others cannot. The contemplated permissions and privileges are extensive and this is only one example.

In another embodiment, a central control model may be used. In the central control model, a host computer, such as computing device 102, creates, controls and manages a linked device group using an administrative session. The linked device group is created by a host computer along with an administrative session 204 and one or more additional user sessions. A shared session on the host computer is created using the agent running in the administrative session 204. The user sessions 112 are assigned to the shared session and input from the input devices of the user sessions is received at the shared session agent 210(1). The displays for each of the user sessions 112 are updated based on an output of the shared session. This central control model may be used on the peripheral devices without input from the user sessions 112. For example, once the user sessions 112 are assigned, they are automatically entered into the shared session. The central control model may also have an optional mode in which, after the user sessions 112 are assigned, the user sessions 112 are then authorized to enter the shared session at their leisure or not enter the shared session at all. The administrative session may also define which resources within the shared session are accessible by specific users. So for example, user 1 may be given full control of resource A while users 2 and 3 may only be given permission to view resource A but they cannot control or modify it.

With respect to the shared session in either the ad hoc peer model or the central control model, the shared session can be configured initially and/or managed at a later time. In the ad hoc peer model, the shared session may have initial settings that are default settings upon login. The shared session may also be set up by the user session 112 by which a user logs in to obtain the additional privileges/controls associated with the administrative session 204. From that point, the administrative session 204 may manage and control the shared session. In a central control model, initial settings may be set as default settings at the host computer. Once an administrative session 204 is created, the shared session settings are displayed at the administrative session 204. The administrative session 204 may then manage and control the shared session settings. One of many functions that a shared session may perform is saving documents created during the shared session. For example, when a user session 112 enters a shared session, audio and video files may become automatically accessible to the other shared session participants. When a document is saved during the shared session, the document may be automatically saved to the shared session. The shared session may also be set up to save a document from time to time at a predetermined amount of time. This is just one small example of many that a shared session may perform. Since there are so many functions that a shared workspace may perform, a few examples are described below to help illustrate.

Another function for a shared session may include altering the structure of a classroom or business meeting. For example, the shared session may be controlled and managed by a teacher to enable a particular group from a shared session to project their user session or sessions for viewing by the other participants in the shared session. In this instance, assume there is a class of nine participants in the shared session, each with their own peripheral device or terminal. The teacher may break the class into three different groups. At the end of the class, the teacher may make a decision to let group 1 present their material. At this point, the three students in group 1 can each manipulate the presentation. The presentation may be on a projector or projected to each of the nine students' display devices with the three members of group 1 being able to control various aspects of the presentation. In this example, the other six students would be spectators in this scenario. While this example is geared toward a teacher-student classroom, this scenario may be applied equally as well to a business environment.

The above example may also be extended to the scenario where there is a token mechanism for passing control of the shared session between participants. For instance, the administrator may pass a token key to a shared session participant giving them full or partial control over the entire shared session or a specific resource or set of resources within a shared session. Once a participant is done using that set of resources they may pass the token to another participant so that they may use the resources. The control may be limited in any imaginable way, such as for a period of time or to control only over certain portions. The administrator may also retain control to revoke the token passing at any time.

Other functions of the shared session may include the ability to eliminate or add applications, provide an aggregate view for the shared session and provide thumbnail views of the desktop or the open applications or other views. The displays of these different views may also incorporate the ability to zoom in and/or zoom out on the views. The functions may also include the ability to conduct a search across user sessions and the ability to prioritize window titles. As another example, a student may have a number of shared sessions active, whether in memory or on disk. It may be useful to view and/or search all of the content in a unified manner. Consequently, possible views may include showing the desktop of each of the shared sessions and/or showing all open windows, including minimized windows, for each of the shared sessions. An administrator may also be able to download and/or open an application to each of the devices within a shared session or to only certain participants within the shared session.

An administrator may also have the ability to browse in a particular session to prevent inefficient use of resources. For instance, a user may start a session, initiate several resources and then log off without shutting down the resources. In the SRC environment with multiple sessions, it may be difficult to know which resources are running and causing inefficiencies. The administrator can browse in the multiple sessions and determine which resources are running and shut them down if necessary.

The shared session may also incorporate context switching Context switching is managed by the administrative session. One example of context switching is allowing participants in a shared session to switch classes at some point during the shared session. For instance, during a break, the administrative session may allow shared session participants to have access to games, personal email, etc. in a personal session. A personal session may include simply operating a terminal as a standalone device or as a device connected to the Internet. However, when the break is over, the administrative session exerts its control and shuts down the personal session and the shared session participants may then be forced to rejoin the shared session may be automatic or manually by the teacher. Again, while the example is directed to a classroom environment, context switching also is equally relevant to a business environment. For instance, taking a break during a business meeting, a meeting organizer may activate another session which the participants may join during the break. Another example may include the ability of an administrator to drive a user session from one workspace to another, thus switching the contexts in which the individual session is participating (e.g., switching from math class and its associated programs, to a history text). It is also possible for context switching to occur with no administrator involved. In this instance, a user may control his or her own context switching.

Yet other functions may be directed to how a workspace is implemented and further abilities for an administrator to control the shared session. For instance, the shared session may be implemented by a Terminal Server (TS) session, a Virtual Machine (VM) session, a computer console session or any combinations of computer console, TS and/or VM sessions. Further, the shared session may be implemented in combination with a collaboration server to implement the shared session over a connected network. The shared session may also be able to detect unlicensed applications and the administrator would then have the ability to delete the unlicensed applications. Administrator may save the states of individual and/or shared sessions. The administrator may also have the ability to control an SRC machine-level undo. For instance, the administrator may fall back to some previous state in the shared session and use that previous state to move forward. The previous state may include both software and hardware configurations. Finally, autosave for a shared session may be implemented at the session level or at the machine level.

Figure 4:
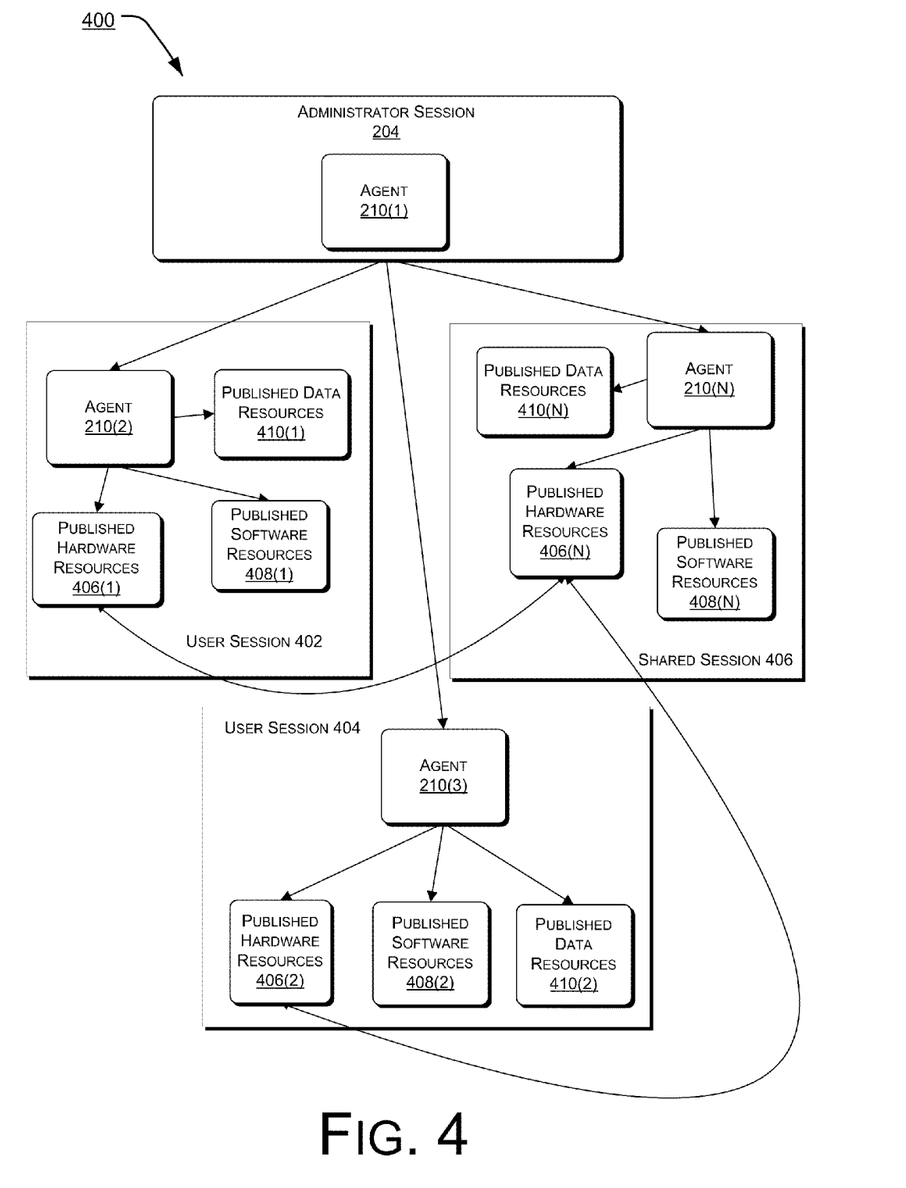
FIG. 4 is a block diagram that illustrates an example of the interaction between the resources in a shared session.

Referring now to FIG. 4, an SRC shared session 400 illustrates one embodiment of the interaction between resources in a shared session. In this case, an administrator session 204 is provided to agents 210(1) . . . 210(N). The administrative session 204 enables input and output between all the agents 210. The input/output may be provided by any type of input device such as a mouse, keyboard, digital tablet, etc. and may provide instructions to the agents 210 at each of the participants in the shared session. Each of the agents 218 in the shared session publishes hardware resources 406(1) . . . 406(N), Software resources 408(1) . . . 408(N), and data resources 410(1) . . . 410(N). The hardware resources 406, software 408, and data 410 are viewable or discoverable by each of the agents 210. In the illustration in FIG. 4, the hardware resources 406 are linked together after being discovered such that they can operate together to carry out tasks in the shared session. The software 408, and data 410 may also be linked. This linked device group operates in the shared session to share resources and enhance the functionality and efficiency of the shared session.

Figure 5:
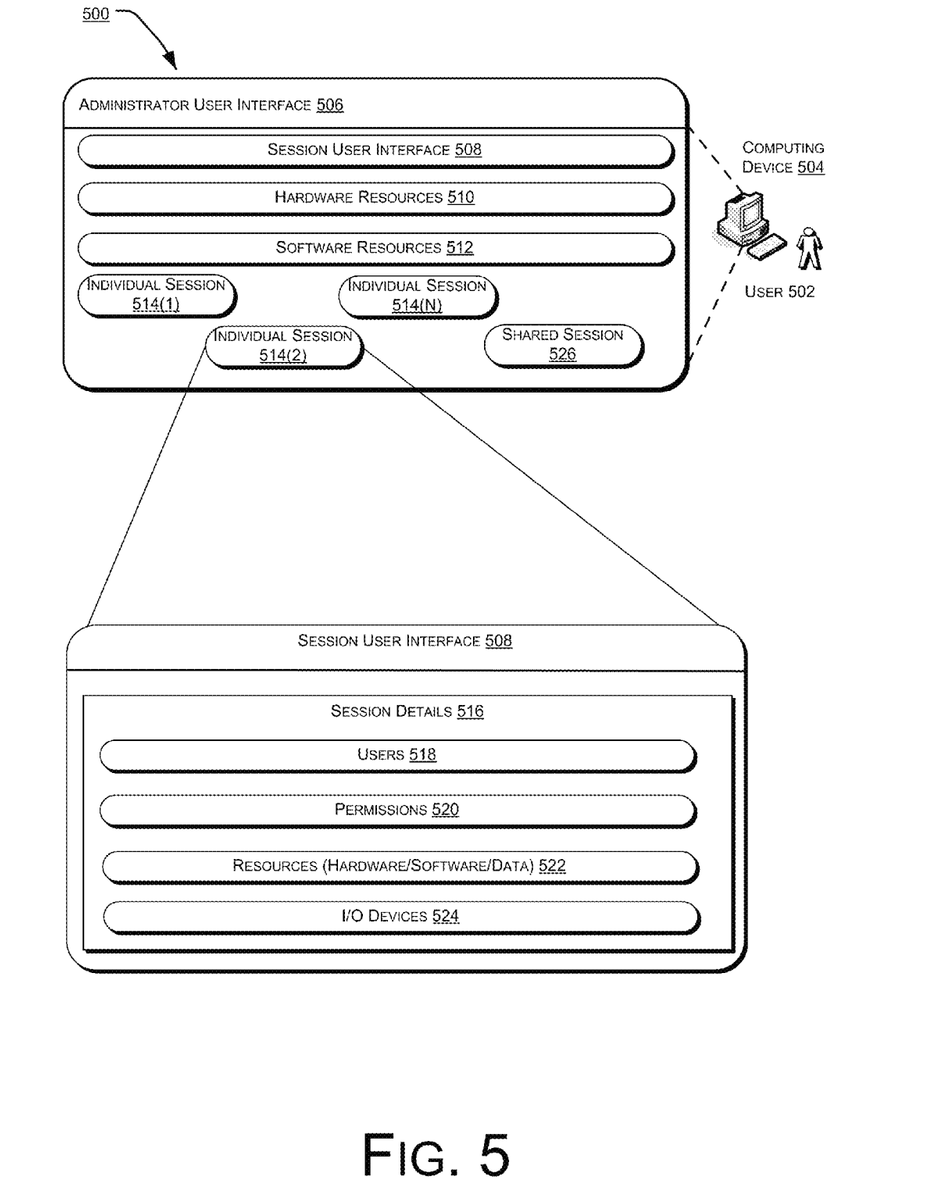
FIG. 5 illustrates an example user interface of an administrator.

Referring now to FIG. 5, an example of the structure of a shared session 500 at a session device is shown. A user 502 and a computing device 504 may be used to control the administrator user interface 506. The administrator user interface 506 has the ability to see, manage and control a session user interface 508, hardware resources 510 and software resources 512 as well as individual sessions 514(1) . . . 514(N).

The hardware resources 510 and the software resources 512 include the resources available to the administrator in the shared session. In the illustrated example, the administrator user interface 506 indicates that the administrator presently has control of three individual sessions 514(1)-(N) and a shared session 526. Selecting one of the sessions 514 or 526 results in additional details of the session being displayed to the administrator. For illustration purposes, the session user interface 508 of individual session 514(2) is shown. Each of the individual sessions 514 may have a similar interface in their session. The session user interface 508 includes session details 516 which may include such information as the number of participants, the name of the class, the name of the administrator, the length of the session, etc.

"Users" 518 identifies the individual terminals that are linked in the shared session. "Permissions" 520 provide the various access privileges for each of the users 518. For instance, some users 518 may have full privileges to use the linked resources which may include resources from individual session 514(2) and other users 518 may only have partial privileges. The administrator has the ability to control some or all of the permissions and individual session 514(2) may have the ability to control some or all of the permissions for its own resources. This depends on the initial and modified settings for the shared session. Resources 522 list both the hardware and software resources available for the shared session and I/O devices 524 list all of the input and output devices available for the shared session. Privileges may also be assigned on a first come, first serve basis or by an underlying operating system group membership.

Illustrative SRC Process

Figure 6:
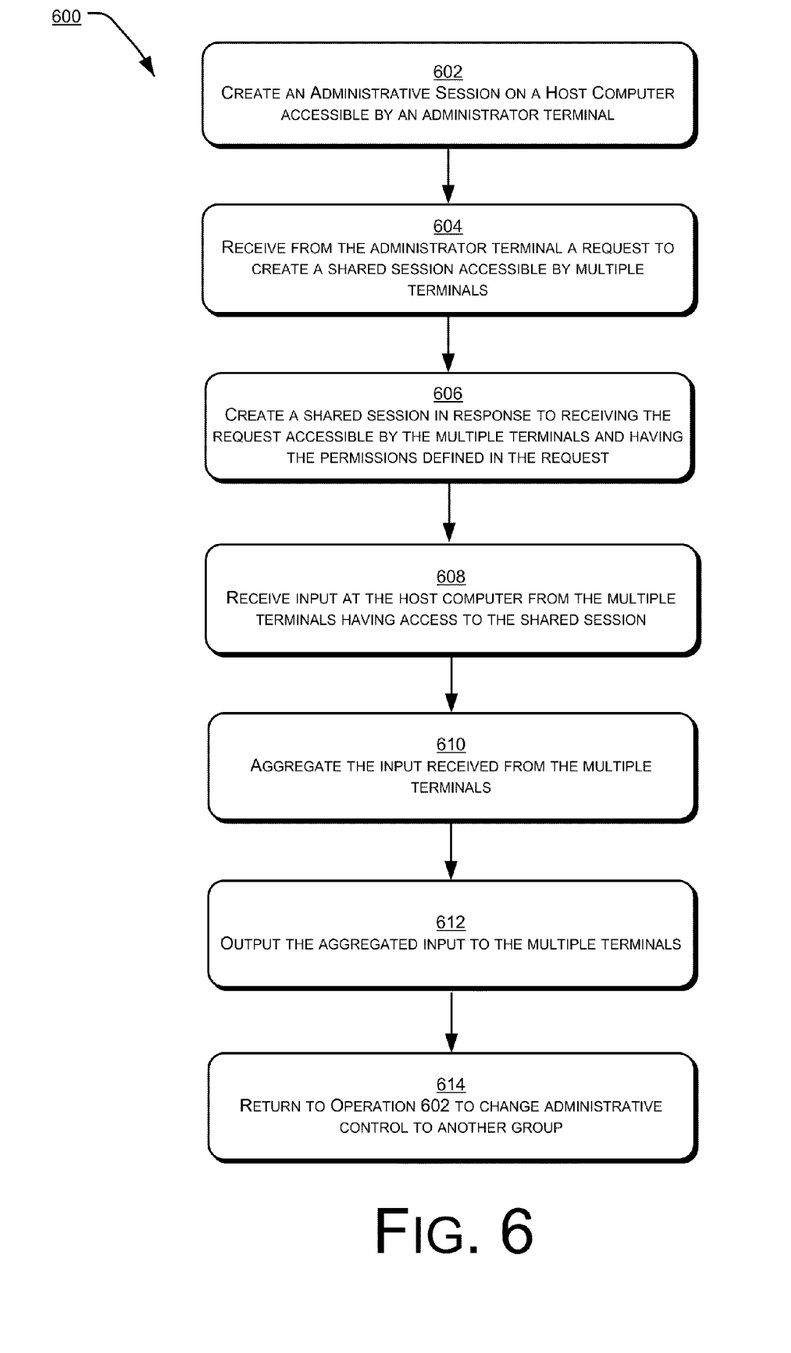
FIG. 6 is a flow diagram of an illustrative process for creating a SRC session in a central control model.

FIG. 6 depicts a flow diagram of an illustrative process for creating an SRC shared session 600. Operation 602 provides an administrative session on a host computer such that the administrative session is accessible by an administrator terminal. In operation 604, a request is received from the administrator terminal to create a shared session accessible by multiple terminals. The request may define permissions to be associated with the shared session. In operation 606, a shared session is created in response to receiving the request. The shared session may be accessible by the multiple terminals and may include the permissions defined in the request. The input is received at the host computer from the multiple terminals that have access to the shared session in operation 608. In operation 610, the input received from the multiple terminals is aggregated. In operation 612, the aggregated input to the multiple terminals is outputted. The process can be restarted by returning to operation 602 and changing the administrative control to another group.

Figure 7:
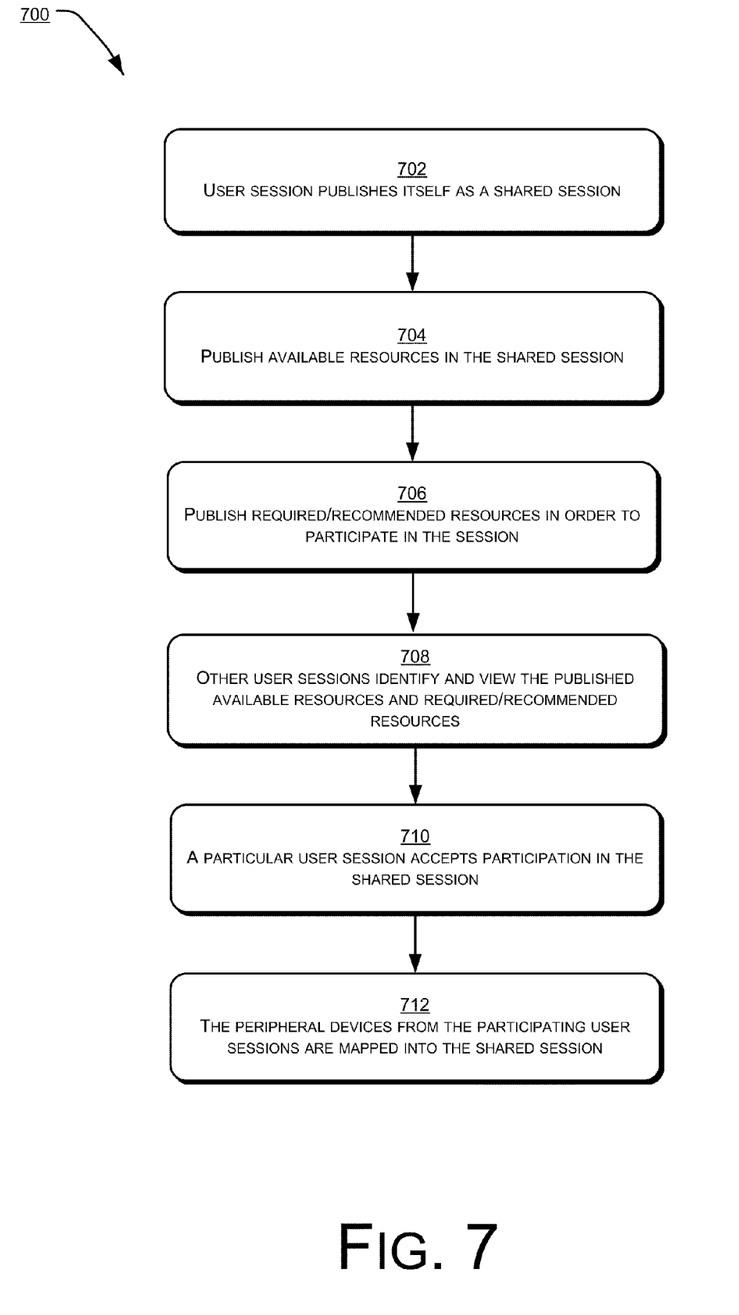
FIG. 7 is a flow diagram of an illustrative process for creating a SRC session in an ad-hoc peer model.

FIG. 7 depicts a flow diagram of an illustrative process for creating an ad-hoc peer SRC shared session 700. In operation 702, one of a number of user sessions publishes itself as a shared session. The shared session publishes the available resources in the shared session in operation 704 and the recommended and/or required resources for participation in the shared session by other user sessions in operation 706. These other user sessions may identify and view the published available resources and the required and/or recommended resources in operation 708 and make a determination whether or not they wish to participate in the shared session. A particular user session may then accept participation in the shared session in operation 710 and the peripheral devices from the participating user sessions are mapped into the shared session in operation 712.

The functions and processes described herein are represented by a sequence of operations that can be implemented by or in hardware, software, or a combination thereof. In the context of software, the blocks represent computer executable instructions that are stored on computer readable media and that when executed by one or more processors perform the recited operations and functions. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For instance, the components can include, but are not limited to, one or more processors (e.g., any of microprocessors, controllers, and the like), a system memory, and a system bus that couples the various system components. The one or more processors process various computer executable instructions to control the operation of the computing device and to communicate with other electronic and computing devices. The system bus represents any number of several types of bus structures, including a memory bus or memory controller, a peripheral bus, an accelerated graphics port, and a processor or local bus using any of a variety of bus architectures.

The SRC system may include a variety of computer readable media which can be any media that is accessible by a computing device and includes both volatile and non-volatile media, removable and non-removable media. The system memory includes computer-readable media in the form of volatile memory, such as random access memory (RAM), and/or non-volatile memory, such as read only memory (ROM).

The computing device may include other removable/non-removable, volatile/non-volatile computer storage media. By way of example, a hard disk drive may read from and write to a non-removable, non-volatile magnetic media, a magnetic disk drive may read from and write to a removable, non-volatile magnetic disk (e.g., a "floppy disk"), and an optical disk drive may read from and/or write to a removable, non-volatile optical disk such as a CD-ROM, digital versatile disk (DVD), or any other type of optical media.

Any number of program modules may be stored on the hard disk, magnetic disk, optical disk, ROM, and/or RAM, including by way of example, an operating system, one or more application programs, other program modules 430, and program data. Each of such operating system, application programs, other program modules, and program data (or some combination thereof) may include an embodiment of the systems and methods described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
providing an administrative session on a host computer, the administrative session being accessible by an administrator terminal;
receiving from the administrator terminal a request to create a shared session accessible by multiple terminals, the request defining permissions to be associated with the shared session;
creating the shared session in response to receiving the request, the shared session being accessible by the multiple terminals and having the permissions defined in the request;
receiving, at the host computer, input from the multiple terminals having access to the shared session;
aggregating, by using a processor, the input received from the multiple terminals;
outputting the aggregated input to the multiple terminals, in which the multiple terminals comprise a user terminal including a user session that publishes an environment to make available hardware resources of the user terminal to be shared by a plurality of users in the shared session;
controlling, by the administrator terminal, allocation of the hardware resources of the user terminal for use by the plurality of users in other user sessions; and
configuring an administrative user interface within the administrative session to provide control over the aggregated input of the shared session, the control including at least changing permissions associated with multiple terminal sessions.

2. The method of claim 1, further comprising associating an agent with each of multiple terminal sessions and the administrator session for communication between each of the multiple terminal and the administrator sessions.

3. The method of claim 2, further comprising displaying, using the agent associated with each of the multiple terminal and the administrator sessions, a user interface for a user to communicate with each of the multiple terminal and the administrator sessions.

4. The method of claim 3, creating, in response to input to the user interface, a local environment that includes selected hardware devices, applications, operating system settings and drivers from each of the multiple terminals.

5. The method of claim 1, wherein one or more multiple terminal sessions are assigned privileges within the shared session.

6. The method of claim 5, wherein the assigned privileges are accomplished by one of:
a first come first serve basis;
a token passed by one or more of the plurality of individual sessions; or
an underlying operating system group membership.

7. The method of claim 1, wherein a user having access to one of the multiple terminals is able to move between a plurality of underlying individual sessions and the shared session.

8. The method of claim 7, wherein the shared session is represented as:
a plurality of windows within the plurality of underlying individual sessions at one of the multiple terminals to provide individual control during the shared session; or a central control window in the administrative terminal for controlling each of the multiple terminals.

9. The method of claim 1, wherein the control includes forcing one of the multiple terminals from the shared session or to the shared session.

10. The method of claim 1, wherein the control includes detecting an unlicensed application in the shared session and removing the unlicensed application from the shared session.

11. The method of claim 1, wherein the changing permissions of the multiple terminal sessions is based at least in part on a context switching during the shared session to allow the multiple terminals to switch to other applications during a break in the shared session.

12. The method of claim 1, wherein the host computer runs the shared session on:
a virtual machine;
a terminal server; or
a console session.

13. A system comprising: a plurality of agents stored in memory on a host computer or host computers;
a plurality of user sessions executing on one or more processors on the host computer or host computers;
a plurality of input/output devices coupled to a shared computing resource to form a linked device group;
a shared session, the plurality of user sessions assigned to the shared session;
an agent, assigned from the plurality of agents, resident on each of the plurality of user sessions that displays a user interface for management of the shared session;
an administrative session created from one of the plurality of user sessions to provide monitoring, reporting and enforcement of the shared session, in which the at least one of the plurality of user sessions publishes an environment to make available a hardware resource to be used in the shared session by a plurality of users in other user sessions, such that the administrator session has control over allocating the hardware resource of the user session to the other user sessions; and
an administrative user interface within the administrative session, configured to provide control over the published environment of the shared session, the control including at least changing permissions associated with individual ones of the plurality of user sessions.

14. The system of claim 13, wherein each of the plurality of user sessions is configured to, via the agent of the respective user session, publish a local environment, the local environment including hardware, software and data resources.

15. The system of claim 13, wherein the agent is configured to monitor the shared session and in response to the monitoring of the shared session, enforce and report interactions within the shared session between the plurality of user sessions and the administrative session.

16. The system of claim 13, wherein the administrative user interface is further configured to provide control over an aggregated output in the shared session.

17. One or more computer readable storage devices comprising computer-executable instructions that when executed by a processor, direct the processor to perform acts comprising:
establishing a shared computing resource environment on a host computer, the shared resource environment including an administrative session;
establishing a shared session on the host computer in response to a command from the administrative session that defines user terminals that are part of the shared session;
receiving, at the administrative session, input allocating multiple user terminals to the shared session;
mapping an aggregated output of the shared session to a plurality of user terminals, in which at least one of the user terminals comprises a user session that publishes a local environment to make available hardware resources to be utilized by the user session participating in the shared session;
controlling, by the administrator terminal, allocation of the hardware resources of the user session for use by the plurality of user terminals in other user sessions; and
configuring an administrative user interface within the administrative session to provide control over the aggregated output of the shared session, the control including at least changing permissions associated with multiple user terminals.

18. The one or more computer readable storage devices of claim 17, further comprising updating a display for each of the plurality of user terminals based at least in part on an output of the shared session.

19. The one or more computer readable storage devices of claim 17, further comprising controlling access to and display of:
an entire desktop;
an individual application and its associated windows;
a plurality of individual application windows; or
a portion of an application window in a shared session.

20. The one or more computer reader storages devices of claim 17, wherein the changing permissions of the multiple user terminals is based at least in part on a context switching during the shared session to allow the multiple user terminals to switch to other applications during a break in the shared session.

* * * * *